United States Patent Office 3,062,782
Patented Nov. 6, 1962

3,062,782
POLYMERS OF DICYCLOPENTYL VINYL ETHER
John C. Tapas and Louis P. Wilks, Chicago, Ill., assignors to Velsicol Chemical Corporation, Chicago, Ill., a corporation of Illinois
No Drawing. Filed Nov. 14, 1960, Ser. No. 68,632
14 Claims. (Cl. 260—47)

This invention relates to a new composition of matter and polymers thereof and, more particularly, to dicyclopentyl vinyl ether and polymers thereof, prepared from the isomer of dicyclopentenyl alcohol having the structure: exo-

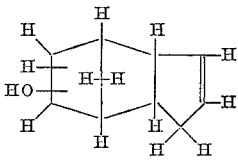

STRUCTURE I

The homopolymers of dicyclopentyl vinyl ether of the present invention have reoccurring structural units of the formula

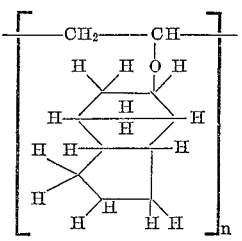

wherein $n$ is an integer greater than 20.

The number of reoccurring structural units ($n$) is determined by the polymerization conditions and the solvent and polymerization catalyst utilized. In general, $n$ is directly related to the molecular weight of the polymer. Thus, when $n$ is 20, the molecular weight of the homopolymer described herein is about 3,500; when $n$ is 57, the molecular weight is about 10,000; and when $n$ is 110, the molecular weight is about 20,000.

Polymers containing olefinic unsaturation are frequently unstable to air and oxygen due to the reactivity to oxygen of the olefinic bond and of the labile hydrogens on the carbon atoms allylic to the double bond. Such attack is evidenced by yellowing and a steady deterioration of the polymer product. The oxidation of the polymer subsequent to exposure to air under conditions of bright light, or ultraviolet light. It is known that light, heat and ultraviolet rays catalyze the oxidation reaction.

The polymeric products of the process of the present invention do not discolor or deteriorate in light or ultraviolet rays and are not subject to the undesirable oxidation reactions. The present polymers have enhanced physical and chemical properties, measurably different from polymers containing dicyclopentenyl vinyl ether units. Furthermore the ether of the present invention can be polymerized with itself under varying conditions to produce homopolymers of a wide range of molecular weights, or can be copolymerized with similar polymerizable and condensable materials having a wide and diverse range of properties.

Thus, it is one object of the present invention to provide polymeric material which is stable to attack by oxygen and other chemicals.

It is another object of the present invention to provide polymeric material which will not discolor or deteriorate in light, sunlight, or ultraviolet light.

Another object of the present invention is to provide a monomeric compound which upon polymerization forms a homopolymer useful as an ingredient in the manufacture of transparent films and coatings.

Still another object of the present invention is to provide copolymeric material useful in the production of pressure sensitive and lamination adhesives.

These and other objects of the present invention will be apparent from the ensuing description.

The ether of the present invention can be readily prepared by catalytically hydrogenating dicyclopentenyl alcohol having Structure I, removing substantially all of the hydrogenation catalyst, treating the resulting dicyclopentyl alcohol acetylene, and recovering the desired ether therefrom.

More specifically, dicyclopentenyl alcohol of Structure I, which can be prepared by the treatment of dicyclopentadiene with dilute sulfuric acid as described by Bruson and Reiner, J.A.C.S., 67, p. 723 (1945), is hydrogenated at an elevated temperature and at super-atmospheric pressure to yield the corresponding dicyclopentyl alcohol. Although the starting unsaturated alcohol may be successfully hydrogenated without a diluent or solvent, it is preferred to add a convenient amount of a suitable solvent or diluent to aid in the control of the hydrogenation reaction. The lower aliphatic alcohols, such as methanol, ethanol, propanol, and butanol have been found to be excellent solvents for this purpose.

To effect the hydrogenation a catalyst is employed. The metals selected from groups 6 and 8 of the periodic table are in general, satisfactory for this purpose. Especially excellent catalysts are activated nickel, platinum, and palladium. These metals may be finely divided to increase the surface area, and used as such, or may be deposited on a suitable carrier, such as palladium deposited on charcoal. In addition active derivatives of the metal may be employed, for example, nickel oxide. The activity of the catalyst is preferably improved before use, such as by methods of production and in situ activation procedures.

The temperature at which the hydrogenation is performed is not critical. Although a small amount of hydrogen will react at normal room temperatures, the rate is slow and the yield relatively poor. Therefore it is peferable to increase the temperature to obtain a rather rapid controllable reaction rate and insure substantially complete conversion. A temperature at or below the boiling point of the solvent or diluent and below the boiling point of both the reactant and the product at the reaction pressure is necessary to maintain a liquid phase.

Although the hydrogenation may be carried out at atmospheric pressure, superatmospheric pressures are preferably employed since the degree of hydrogenation in a given time is, in general, a function of the pressure. The reaction can be conveniently performed at pressures as low as 30 to 100 pounds per square inch or as high as pressures in the order of 10,000 pounds per square inch.

The time during which the starting material is subjected to hydrogenation is dependent upon the temperature and pressure. In general, the hydrogenation is continued until hydrogen is no longer taken into the reaction solution.

After the hydrogenation has been completed the hydrogenation catalyst is removed from the reaction solution. The method of removal is dependent upon the viscosity of the solution and the physical characteristics of the catalyst. For example, when finely ground metal deposited on a small particle carrier, such as 10% palladium on carbon, is utilized with a 50% by volume solution of starting material with methanol, the catalyst may settle to the bottom of the reactor and the supernatant liquid can be removed by decantation. If a heavier solvent is utilized, such as butanol, the catalyst may not settle, but can readily be removed by filtration. Other methods may be utilized for the removal, such as centrifugation.

The solvent is next removed by a suitable method such as atmospheric or vacuum distillation.

The intermediate dicyclopentyl alcohol is next treated with acetylene by forming a solution of an alkali metal salt of a portion of the alcohol in the remainder of the alcohol. The formation of the salt is necessary as the alcohol as such will not react with the acetylene. While the alcohol salt solution can be formed by the reaction of the alcohol with an alkali metal hydroxide at temperatures in the order of 180° C., such formation is not desirable since the reaction must then be carried out at about the same temperature, thereby forming a large quantity of by-products and undesirable residues. It is preferred to form the salt solution by the addition of the alkali metal to the alcohol. Suitable alkali metals are sodium, potassium, and lithium.

While the etherification can be performed without the use of a solvent, it is preferred to add a solvent for the acetylene, such as dimethyl sulfoxide or the dimethyl ether of diethylene glycol, to hold the acetylene in solution and to increase the conversion to the ether. The amount of solvent is not critical and an equal weight of solvent to alcohol reactant is satisfactory. The etherification reaction is conveniently performed at atmospheric pressure, although higher pressures may be successfully utilized.

The employment of a solvent for the acetylene permits the use of temperatures in the range of 120–170° C., a range preferred for maximum conversion with a minimum of undesirable by-products. The performance of the reaction without the solvent requires higher temperatures, such as 195–200° C., and results in a lower yield.

The time during which the alcoholic salt solution is under treatment is dependent upon the temperature and pressure utilized, the efficiency of the contact of the acetylene with the alcoholic salt, and the degree of conversion desired. In general, when approximately one-half liter of alcoholic salt solution is treated at 140–160° C. and atmospheric pressure with stirring provided by an agitator, and with the aceylene bubbling through a tube under the surface of the solution, about 3 to about 6 hours is required for maximum conversion.

Dicyclopentyl vinyl ether can readily be isolated from the reaction solution by a vacuum distillation to remove the volatile materials as a two-liquid phase co-distillate. The heavier phase contains the solvent and a small amount of product, while the lighter phase contains product and a small amount of solvent. The product phase is extracted by adding a small amount of volatile organic solvent, such as diethyl ether, pentane, hexane, and the like, and washing with water. The product phase is separated from the raffinate and dried over a drying agent such as sodium sulfate. The solvent is removed by distillation of the residue.

Alternatively, the product can be isolated by pouring the reaction solution into a large excess of water, adding an extraction solvent, such as those heretofore described, and separating the resulting two liquid phases. The organic phase is washed with water, and dried over a drying agent. The extraction solvent is removed by distillation and the monomeric product is recovered by vacuum distillate of the residue.

The homopolymer of dicyclopentyl vinyl ether of the present invention can readily be prepared by the catalytic polymerization of the ether in a solution with a suitable solvent. The polarity of the solvent and the temperature of the polymerization are factors in the determination of the molecular weight of the homopolymer. For example, the polymerization performed in a low melting solvent, such as toluene, at −60° C. yields a homopolymer having a molecular weight of between about 3,500 and about 10,000 as measured cryoscopically, while polymerization of the same starting material at 0° C. yields a lower molecular weight of homopolymer. Polymerization of the ether in a more polar solvent, such as carbon disulfide, yields a higher molecular weight homopolymer having a molecular weight of at least 20,000 as measured cryoscopically. It is preferred to utilize aromatic solvents and temperatures of about −20° C. to about 30° C. to obtain low molecular weight homopolymer, the same or similar solvent at lower temperatures of between about −70° C. and about −20° C. to obtain higher molecular weight homopolymer and more polar solvents such as carbon disulfide at about −70° C. to about 0° C. to obtain still higher molecular weight homopolymer. The amount of solvent is not critical and should be present in sufficient quantity to afford good polymerization reaction control and prevent gelling of the reaction mixture. In general, a monomer solution of about 10% to about 50% ether in solvent has been found satisfactory.

The polymerization is performed readily with high yields by the use of a suitable polymerization catalyst. In general, the acid catalysts will catalyze the reaction and the strong Lewis acids are preferred for maximum yield and process control. Examples of the preferred strong Lewis acids are boron trichloride, boron trifluoride, boron trifluoride-etherate complexes, tin tetrachloride, and aluminum trichloride. The amount of catalyst may vary from about 1% to about 15% by weight of the ether reactant.

The polymerization reaction is conveniently performed at atmospheric pressure, although higher pressures may be successfully employed.

The reaction proceeds rapidly after an initial exotherm. While the reaction can be complete after several minutes, it is preferred to hold the ether at the reaction conditions for several hours to assure complete polymerization.

While the polymerization catalyst can be neutralized and removed from the reaction solution by any of the methods used in the polymer art, such as neutralization with sodium or potassium carbonate followed by removal of the solid salts, it is most convenient to neutralize the catalyst with a solution of an aliphatic alcohol saturated with ammonia, permitting the temperature of the reaction solution to increase to about −10° C. to about 20° C., and subsequently filtering off the inorganic material.

To isolate the substantially moisture-free homopolymer from the solvent solution, it is convenient to mix the solution with an excess of a lower aliphatic alcohol, and separate the precipitated homopolymer from the polymerization solvent. The homopolymer is next dried by vacuum, heat, or a combination of the two to yield the dry valuable homopolymer.

Similarly, copolymers can readily be prepared by performing the polymerization with a mixed starting solution of dicyclopentyl vinyl ether, second polymerizable of condensable compound and reaction solvent. The procedure described for isolation of the dicyclopentyl vinyl ether homopolymer can then be used to obtain the desired copolymer.

The vinylic ethers are suitable polymerizable compounds useful to form the copolymers of the present invention. The vinylic ethers may be selected from the vinyl aliphatic, vinyl aromatic, vinyl cycloaliphatic and vinyl polycycloaliphatic ethers. Examples of the vinyl aliphatic ethers are: vinyl ethyl ether, vinyl 2-chloroethyl ether, vinyl n-butyl ether, vinyl isobutyl ether, vinyl hexyl ether, and vinyl 2-ethylhexyl ether. An example of a suitable vinyl aromatic ether is vinyl phenyl ether, while an example of a vinyl dicycloaliphatic ether is vinyl decahydronaphthyl ether.

The following examples are presented by way of illustration of the preparation of dicyclopentyl vinyl ether and the polymer products thereof.

EXAMPLE 1

*Preparation of Dicyclopentyl Alcohol Having the Structure*

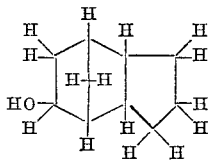

STRUCTURE II

Dicyclopentene alcohol of Structure I (200 g., 1.3 moles), prepared as described by Bruson and Reiner, J.A.C.S., 67, p. 723 (1945), and methanol (20 cc.) was placed into a 375 ml. glass pressure bottle. To this solution was added 10% palladium on carbon catalyst (1 g.). The bottle was sealed and placed into a Parr hydrogenation apparatus. The system was evacuated to about 25 pounds per square inch vacuum, followed by a flushing with hydrogen gas. This procedure was repeated several times. The system was then pressured with hydrogen gas to 63 pounds per square inch. The apparatus was started. Only a few pounds of hydrogen was taken up until a heat lamp was provided with its face several inches from the shielded pressure bottle. As the pressure dropped to about 45 pounds per square inch, the system was repressured. The repressuring was performed six times. Additional catalyst (2 g.) was added in one-gram portions at intermediate time intervals during the 24 hours, in which the reaction was performed. A total of 1.5 moles of hydrogen was utilized.

The reaction mixture was permitted to cool and was transferred to an Erlenmeyer flask. To isolate the product, namely, dicyclopentyl alcohol of Structure II, the reaction mixture is filtered on a sintered glass filter to remove the catalyst. The catalyst must be kept wet since it oxidizes readily in air and may ignite the solvent vapors. The solvent is then removed under vacuum, leaving as the residue the desired alcohol. The product can be used as such or can be purified by vacuum distillation and recovered as the distillate boiling at 63–66° C. at 1 mm. of mercury pressure.

EXAMPLE 2

*Preparation of Dicyclopentyl Vinyl Ether*

Dicyclopentyl alcohol of Structure II (170 g.; 1.12 moles) prepared by the method of Example 1, and potassium hydroxide (8 g.; 5% by weight based on weight of alcohol), in flake form, were placed into a 500-cc. 3-necked round-bottom flask fitted with a mechanical stirrer, thermometer and gas inlet tube. The flask was heated for a period of 20 hours, thereby controlling the temperature at 180° to 200° C., while acetylene gas was bubbled through the reaction mixture at a slow rate, after being scrubbed by bubbling through concentrated sulfuric acid. Midway through the reaction period, several additional flakes of potassium hydroxide were added to the flask.

The contents of the flask were allowed to cool and were mixed with diethyl ether (150 cc.). The etheral solution was washed with four portions of water (25 cc. per portion), dried over a mixture of anhydrous potassium carbonate and anhydrous sodium sulfate for about 12 hours, and filtered free of the drying mixture. The ether solvent was removed by vacuum on an aspirator. Sodium metal (7 g.; an excess amount) was added to the residue and the mixture heated in vacuo to distill dicyclopentyl vinyl ether, as the product boiling at 95–97° C. at 3.25 mm. of mercury pressure. This product has a refractive index of 1.4957 at 20° C. and an infrared scan as follows: no band in the hydroxyl region, and the requisite vinyl ether bands at 1600 cm.$^{-1}$, 1200 cm.$^{-1}$, 965 cm.$^{-1}$, 945 cm.$^{-1}$, and 810 cm.$^{-1}$. The dicyclopentyl vinyl ether product had the following elemental analysis as calculated for $C_{12}H_{18}O$:

|  | C | H |
| --- | --- | --- |
| Theoretical, percent | 80.85 | 10.17 |
| Found, percent | 80.82 | 10.14 |

EXAMPLE 3

*Preparation of Dicyclopentyl Vinyl Ether*

Dicyclopentyl alcohol of Structure II (140 g., 0.92 mol) prepared by the method of Example I, and sodium metal (4 g.) were placed into a 500-ml. 3-necked round-bottom flask equipped with mechanical stirrer, thermometer, a stoppered gas inlet tube with the outlet set below the liquid level, and Allihn-bulb type condenser topped with a calcium chloride drying tube. The contents of the flask were vigorously stirred and the flask heated by means of an electric heating mantle. An exothermic reaction took place at 105° C. and the temperature rapidly increased at 145° C., without additional heating, at which point all sodium metal had entered into solution. The solution of the sodium salt in alcohol was cooled to about 80° C. Dimethyl sulfoxide (140 g., 1.6 moles) was added to the flask. An acetylene cleaning train was set up containing two dry traps with an intermediate sulfuric acid bubbler trap.

The reaction solution was heated to 135° C., at which temperature acetylene gas was bubbled into the solution for a period of 3½ hours. The temperature varied between about 135° C. and about 160° C., but was held mainly between 140 to 150° C. A small aliquot portion was withdrawn from the flask, worked up by the following procedure, and found by infrared scan to be void of hydroxy radicals. The small aliquot was poured into an excess of water and extracted therefrom with about 20 cc. of diethyl ether. The ether extract was washed thrice with about 15 cc. portions of water, dried over sodium sulfate, and filtered from the drying agent. The diethyl ether was removed by vacuum from an aspirator at room temperature to yield the desired product as the residue.

The reaction apparatus was altered by removing the acetylene train and gas inlet tube, and providing a side arm tube connected to a vacuum pump. The flask was heated by means of the heating mantle. As the temperature increased, two liquid phases could be distinguished. All the material was collected in one receiver. The dimethyl sulfoxide phase distilled over at 85–7° C. at 22 mm. mercury pressure, while a fraction containing mainly product ether distilled over at 116–8° C. at 22 mm. mercury pressure. The co-distillates were separated from the receiver. Water (200 cc.) was added to the dimethyl sulfoxide phase, and the mixture was treated with diethyl ether (100 cc.) to extract the ether product. The extract was added to the product phase from the codistillation. This combined product phase was extracted six times with water (100 cc. portions) to remove dimethyl sulfoxide solvent from the product solution. Said solution was dried over sodium sulfate and the drying agent was filtered from the solution.

The diethyl ether extraction solvent was removed from the product solution by vacuum from an aspirator. The product solution was then vacuum distilled to yield a fraction (about 5 g.) of material boiling below 61° C. at 1 mm. mercury pressure and a second fraction boiling 61–63° C. at 1 mm. mercury pressure. The combined fractions constituted an 80% yield of an almost colorless liquid determined to be dicyclopentyl vinyl ether.

EXAMPLE 4

*Preparation of a Homopolymer of Dicyclopentyl Vinyl Ether*

A portion of the product of Example 2, (11.2 g., 0.062 mol) was dissolved in sufficient toluene to form 210 cc. of solution. A 500-cc. 5-necked round-bottom flask equipped with mechanical stirrer, thermometer, nitrogen inlet, nitrogent outlet topped by a calcium chloride drying tube, and a self-sealing gasket stopper, was alternately swept with flame and flushed with nitrogen until moisture could no longer be driven from the system. Throughout the reaction a positive pressure of nitrogen was maintained in the system. The reaction solution was placed in the flask, which was cooled to $-60°$ C. with stirring by means of a Dry Ice (0.5 cc.) acetone bath. Boron trifluoride-etherate complex was injected into the solution by a means of a syringe through the self-sealing gasket. The reaction was allowed to continue for a period of 4 hours to insure complete conversion.

The activity of the catalyst was destroyed by adding a solution of methanol (10 cc.) saturated with ammonia gas. The reaction solution was allowed to stand at room temperature until the temperature increased to $20°$ C. over a period of 45 minutes. The solution was then poured into a large excess of methanol, thereby precipitating the homopolymer. After 1½ hours of precipitation, the supernatant liquid was decanted and the precipitated homopolymer was washed three times with methanol (100 cc. portions) and dried under vacuum for about 12 hours. The yield of dry homopolymer was about 95.6% of theoretical. The homopolymer had a molecular weight of about 9,520 as determined cryoscopically.

EXAMPLE 5

*Preparation of a Higher Molecular Weight Homopolymer of Dicyclopentyl Vinyl Ether*

The reaction apparatus utilized in Example 4 was alternately swept with flame and flushed with nitrogen gas several times until moisture ceased to escape. Product of Example 2 (22.3 g., 0.12 mol) was dissolved in sufficient carbon disulfide to obtain 210 cc. of solution, which was added to the flask. The flask was cooled by means of the bath to $-62°$ C. A positive pressure of nitrogen gas was maintained throughout the polymerization. Boron trifluoride-etherate complex (0.5 cc.) was injected through the self-sealing gasket by means of a syringe. The temperature of the reaction solution was maintained at $-45$ to $-62°$ C. by means of the bath. After 3½ minutes the exotherm reached its maximum and the temperature started to fall. The reaction was allowed to continue for a period of 4 hours to insure complete conversion.

The activity of the catalyst was destroyed by adding a solution of methanol (15 cc.) saturated with ammonia gas. The reaction solution was allowed to warm up to $11°$ C. in 25 minutes and was poured into a large excess of methanol. The homopolymer precipitated therefrom, was washed three times wth methanol (100 cc. portions) and dried for about 12 hours under vacuum. The homopolymer did not have a softening point under $350°$ F. as determined by a ball and ring test in glycerine. The ball did not touch the bottom at any temperature, but was supported by the homopolymer even above $400°$ F.

A portion of the homopolymer was further purified by dissolving in benzene, precipitating from excess methanol, washing with methanol and ethanol, and drying under vacuum at $75°$ C. The washing and drying was repeated several times until all carbon disulfide and impurities had been removed. The molecular weight of this homopolymer was found to be about 19,000 by cryoscopic determination.

EXAMPLE 6

*Preparation of a Copolymer of Dicyclopentyl Vinyl Ether and Vinyl-2-Ethylhexyl Ether*

The polymerization apparatus used in the previous examples was alternately swept with flame and flushed with nitrogen gas several times until moisture no longer could be driven off. Product of Example 3 (22.3 g., 0.12 mol) and vinyl-2-ethylhexyl ether (19.5 g., 0.12 mol) was dissolved in toluene (200 cc.), the resulting solution dried over sodium hydroxide, and placed in the flask. A positive pressure of nitrogen gas was maintained in the flask throughout the polymerization. The flask and its contents were cooled to $-66°$ C. and technical grade boron trifluoride-etherate complex (2 cc.) was injected into the solution through the self-sealing gasket by means of a syringe. The flask was cooled with a Dry Ice-acetone bath, thereby controlling the reaction temperature between $-40$ and $-69°$ C. After 1¼ minutes the exotherm stopped and the temperature fell. The reaction was allowed to continue for a period of 3½ hours to insure complete conversion.

The activity of the catalyst was destroyed by adding a solution of methanol (20 cc.) saturated with ammonia gas. The copolymer was precipitated from about one liter of methanol, which was mechanically agitated for 30 minutes. The agitator was stopped, the precipitate allowed to settle, and the supernatant liquid decanted. Another liter of methanol was added and the procedure repeated. Water (800 cc.) was added as a wash followed by decantation of the wash-water, and a third methanol washing settling, and decantation. The product was dried under vacuum for about 12 hours. The now sticky product was dissolved in carbon disulfide (300 cc.), filtered through a medium sintered glass funnel, and added to methanol (1 liter). This mixture was stirred for one hour, the stirrer halted, the precipitate allowed to settle, and the supernatant liquid decanted. The precipitate was washed twice with methanol (100 cc. portions), dried under vacuum for about 1½ hours and heated in a vacuum oven for about 16 hours. Upon removal from the oven, the copolymer was a colorless molten mass and could be drawn into long filaments. The copolymer was formed into a thin flexible film by squeezing onto a Fisher block and easily flowed at 70–75° C. under a slight pressure. Upon cryoscopic determination, the copolymer was found to have a molecular weight of 6800 and a composition of 4½ units of dicyclopentyl vinyl ether to each unit of vinyl 2-ethylhexyl ether.

The other copolymers of the present invention can also be prepared by the method of Example 6. Thus dicyclopentyl vinyl ether (denoted by "A"), can be reacted with the designated compound to form the corresponding copolymer:

Example 7   A+Vinyl ethyl ether
Example 8   A+Vinyl 2-chloroethyl ether
Example 9   A+Vinyl n-butyl ether
Example 10  A+Vinyl isobutyl ether
Example 11  A+Vinyl phenyl ether
Example 12  A+Vinyl decahydronaphthyl ether
Example 13  A+Vinyl decahydronaphthalenyl ether The polymers of the present invention have valuable utility as ingredients in adhesives and as films and coatings. As a specific example of such utility, the dicyclopentyl vinyl ether homopolymer product of Example 5 was dissolved into xylene to form a 20% polymer solution, which was subsequently plasticized with 20% by weight dioctyl phthalate. Films were cast from this solution onto plate glass and opaque glass, and air dried. The plasticized film was colorless, transparent and flexible. The film on the opaque glass was subjected to a Fadeometer test, and showed only a negligible amount of discoloration after 200 hours.

This usefulness is enhanced by solubility in aromatic and chlorinated solvents, and compatibility with the common plasticizers.

The copolymers of the present invention have a wide range of properties, and are thereby useful in various areas of application. For example, the copolymer of the ether of this invention and vinyl-2-ethylhexyl ether having a ratio of 4½ units of the former to one unit of the latter, is extremely valuable as a pressure-sensitive adhesive. A solution of 20% of the copolymer in xylene brushed on the back of a vinyl tile and covered with a vegetable parchment paper as backing has excellent release properties. A similar tile coated with solution and with the backing removed was pressed firmly onto a cement floor, thereby bonding the tile to the floor with a permanent bond, without any signs of creep or curling. The copolymers are also useful as pressure-sensitive adhesives for tapes, wherein a backing material is provided and once removed, the tape forms a permanent bond with the taped material. The copolymers of the present invention are also useful in laminating adhesives and form a permanent bond between the laminated materials.

The term "dicyclopentyl alcohol" denotes the compound having the structural formula represented by Structure II, and the term "dicyclopentenyl alcohol" the compounds having the structural formula represented by Structure I. The term "dicyclopentyl vinyl ether" denotes the compound herein described by that term and having the structure:

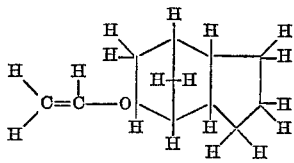

We claim:

1. A new composition of matter comprising a solid homopolymer of dicyclopentyl vinyl ether having reoccurring structural units of the formula

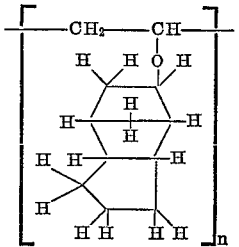

wherein $n$ is an integer greater than 20.

2. The composition of claim 1, wherein $n$ is an integer from 20 to 57.

3. The composition of claim 1, wherein $n$ is an integer from 57 to 110.

4. The composition of claim 1, wherein $n$ is an integer greater than 110.

5. A new composition of matter comprising a solid copolymer formed by reacting dicyclopentyl vinyl ether and a vinylic ether having the vinyl group as its only unsaturation under catalytic polymerization conditions.

6. A new composition of matter as described in claim 5, wherein the vinylic ether is a vinyl aliphatic ether.

7. A new composition of matter as described in claim 5, wherein the vinylic ether is a vinyl aromatic ether.

8. A new composition of matter as described in claim 6, wherein the vinylic ether is a vinyl cycloaliphatic ether.

9. A new composition of matter as described in claim 5, wherein the vinylic ether is a vinyl polycycloaliphatic ether.

10. A new composition of matter comprising a solid copolymer formed by reacting dicyclopentyl vinyl ether and vinyl ethyl ether under catalytic polymerization conditions.

11. A new composition of matter comprising a solid copolymer formed by reacting dicyclopentyl vinyl ether and vinyl phenyl ether under catalytic polymerization conditions.

12. A new composition of matter comprising a solid copolymer formed by reacting dicyclopentyl vinyl ether and vinyl n-butyl ether under catalytic polymerization conditions.

13. A new composition of matter comprising a solid copolymer formed by reacting dicyclopentyl vinyl ether and vinyl 2-ethylhexyl ether under catalytic polymerization conditions.

14. A new composition of matter comprising a solid copolymer formed by reacting dicyclopentyl vinyl ether and vinyl decahydronaphthyl ether under catalytic polymerization conditions.

References Cited in the file of this patent

UNITED STATES PATENTS

| | | |
|---|---|---|
| 2,157,348 | Reppe et al. | May 9, 1939 |
| 2,749,328 | Cline | June 5, 1956 |
| 2,825,719 | Herrle et al. | Mar. 4, 1958 |

UNITED STATES PATENT OFFICE
CERTIFICATE OF CORRECTION

Patent No. 3,062,782                          November 6, 1962

John C. Tapas et al.

It is hereby certified that error appears in the above numbered patent requiring correction and that the said Letters Patent should read as corrected below.

Column 1, line 50, for "product. The" read -- product by the --; column 2, line 14, after "alcohol" insert -- with --; line 45, for "peferable" read -- preferable --; column 3, line 67, for "distillate" read -- distillation --; column 5, line 14, for "Dicyclopentene" read -- Dicyclopentenyl --; column 7, lines 3 and 4, for "nitrogent" read -- nitrogen --; line 12, strike out "a", first occurrence; column 8, line 26, after "washing" insert a comma; column 10, line 16, for the claim reference numeral "6" read -- 5 --.

Signed and sealed this 4th day of June 1963.

(SEAL)
Attest:

ERNEST W. SWIDER                          DAVID L. LADD
Attesting Officer                             Commissioner of Patents